Dec. 10, 1946.  H. C. BEHRENS  2,412,243
ADJUSTING AND DRIVING MECHANISM FOR ROTARY MEMBERS
Filed Oct. 19, 1943  2 Sheets-Sheet 2
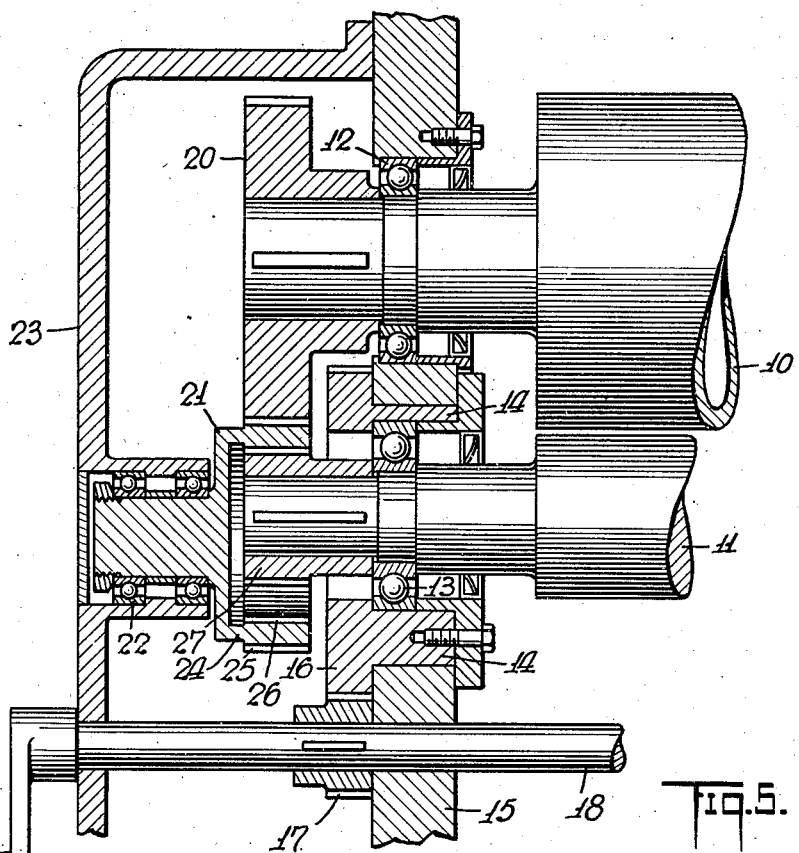
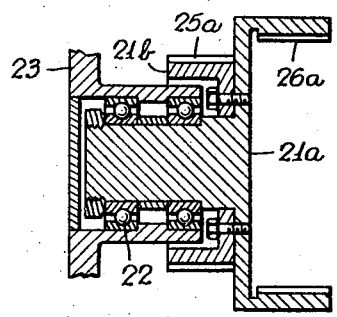
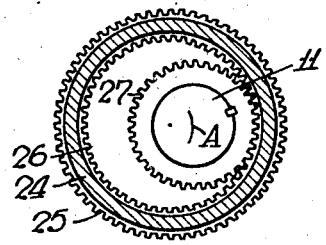
INVENTOR
Herbert C. Behrens
BY
Dean Fairbank & Hirsch
ATTORNEYS Patented Dec. 10, 1946

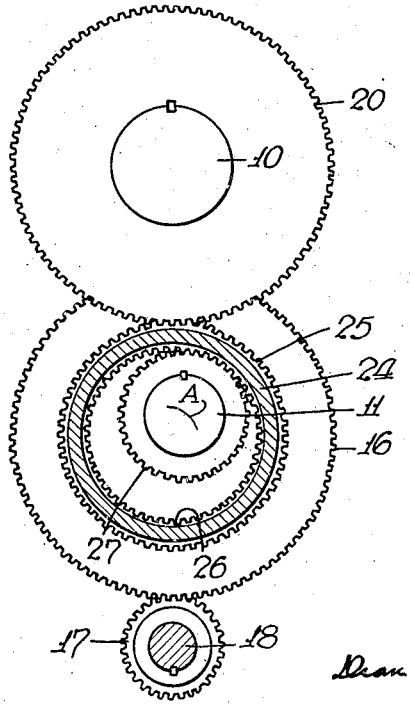

UNITED STATES PATENT OFFICE 2,412,243

ADJUSTING AND DRIVING MECHANISM FOR ROTARY MEMBERS

Herbert C. Behrens, Haddon Heights, N. J., assignor to Samuel M. Langston Co., Camden, N. J., a corporation of New Jersey Application October 19, 1943, Serial No. 506,823

7 Claims. (Cl. 74—395)

This invention relates to that type of mechanism in which there is provided a rotary member, the position of which is to be adjusted from time to time while maintaining proper driving connections to a source of power. The rotary member may be employed for various different purposes, as for instance, to act upon material passing through the machine, and the necessity for adjustment may be for various different reasons, for instance, to permit the proper action on material of different thicknesses.

An example of a machine in which my invention may be employed to advantage is a printer slotter for forming box blanks from sheet material of different thicknesses. In such a machine there are usually provided a pair of feed rollers for the sheet, one or more pairs of printing and impression rollers for printing on a sheet, a pair of scoring rollers, and a pair of slotting rollers. It is necessary to relatively adjust the rollers of some, if not all, of such pairs, in accordance with the thickness of the blank operated upon, so as to obtain proper feeding, printing, scoring, and/or cutting. My invention may be employed with one roller of each or all of said pairs, as well as for rotary members of other types of machines.

It is common practice to mount a roller in eccentric bearings which may be rotated to the desired extent to vary the distance between the periphery of the roller and some other element such as another roller. Various mechanisms have been employed for transmitting power to a roller mounted in eccentric bearings, so as to deliver power thereto with the roller in its various adjusted positions, but all such mechanisms with which I am familiar are open to certain objections, such as failure of the gears to properly mesh in some positions, the use of sliding connections subject to wear and lost motion, pivoted links subject to wear at the pivots and carrying a train of gears, and the use of various other devices subject to the same or other objections.

The main object of the present invention is to provide a simple mechanism in which the gears are constantly in proper and accurate mesh with the roller in all of its various operating positions, which employs the minimum number of gears and avoids the use of sliding connections and other such objectionable features.

In carrying out my invention, I provide as an important feature an annular gear having internal and external teeth, and which has its axis in alignment with the axis of the eccentric bearing of the rotary member. Power may be transmitted to this annular gear through the exterior teeth and the interior teeth may mesh with a pinion on said rotary member so that as the position of the bearing of said rotary member is adjusted by the rotation of the eccentric bearing, the pinion of said member will be maintained in proper mesh with the interior teeth of the annular gear which is co-axial with the eccentric bearing. Thus, there is only a single gear for transmitting power from the driving gear to the gear of the rotary member and the proper meshing with both is maintained at all times.

In the accompanying drawings,

Fig. 1 is a diagrammatic view of a gear train embodying my invention.

Fig. 2 is a section through a portion of a machine embodying the gear train.

Fig. 3 is a section on the line 3—3 of Fig. 2, but with the gears in a different adjusted position.

Fig. 4 is a section similar to a portion of Fig. 3, and showing a further adjusted position of the gears, and Fig. 5 is a longitudinal section through a modified form of idler gear.

In the apparatus shown in Fig. 2, there are provided two rollers 10 and 11 between which material is to pass. In practice, these rollers may be modified through a wide range and in accordance with the purpose they are to serve. They may be feed rollers, crushing rollers, or the like, or may be provided with the proper elements for slotting, scoring, slitting, printing or otherwise treating sheet material. The upper roller 10 is mounted in stationary bearings 12 of any suitable character, while the bearing 13 is mounted for adjustment toward and from the bearing 12 to bring the two rollers to the proper spacing. This adjustment is by means of a sleeve 14 mounted for rotation in a frame member 15 and having the bearing 13 eccentrically disposed in respect to the axis of said sleeve 14. Thus, the bearing 13 is eccentrically mounted and by rotation of the sleeve 14, the rollers may be brought toward or from each other. Any suitable means may be provided for oscillating the eccentric sleeve 14; for instance, its outer portion may be in the form of a gear 16 meshing with a pinion 17 on a shaft 18 provided with a handle 19 or other suitable means for rotating the shaft and pinion and thereby rotating the eccentric sleeve. Although in the drawings I have shown the supports for only one end of the rollers, it will be understood that the parts so far described may be duplicated at the opposite end of the machine and the shaft 18 provided with a second pinion so that as the shaft is rotated, the two rollers 10 and 11 are kept in parallelism. The upper roller is provided with a suitable driving gear 20 which may receive power from any suitable source through a gear or pinion meshing therewith or the upper roller 10 may be directly driven in any other suitable manner.

The important feature of my invention relates to the means for the driving of the roller 11 in all adjusted positions of the latter, and in such a way that the gears of the gear train are kept in proper mesh at all times. As shown, there is provided an idler 21 mounted in suitable bearings 22 in a frame part 23 of the machine. This frame part may serve as a cover to protect and conceal the gear train. The idler has an annular flange 24 with external teeth 25 and internal teeth 26; the former meshing with the gear 20 of the roller 10 and the latter meshing with a pinion 27 on the roller 11. The idler 21 is mounted with its axis in alignment with the axis of the exterior of the sleeve 14 so that power is transmitted from the gear 20 to the idler through the exterior teeth on the latter and from the idler through the internal teeth to the pinion 27 of the roller 11.

As the axis of the roller 10 and the idler 21 are fixed, the idler and the gear 20 will remain in mesh at all times. As the axis of the eccentric sleeve 14 is in alignment with the axis of the idler, the rotation of the eccentric sleeve will move the lower roller in an arcuate path, but the pinion 27 will remain at all times in proper mesh with the internal gear of the idler. Thus, in all positions of the eccentric and therefore all positions of the roller 11, there will be the proper gear meshing at all times and the proper transmission of power. The arcuate path of the axis of the roller 11 is indicated by the curved line A in Fig. 3. In this figure, the axis of the roller 11 is in about the position of the numeral 1 of a clock dial and in respect to the axis of the eccentric.

In Fig. 4, the gears are in the position which they would occupy after rotating the eccentric about its axis through about 60° to the 3 o'clock position on a clock dial. The minimum distance between the rollers 10 and 11 will be when the axis of the roller 11 is directly above the axis of the eccentric and the maximum spacing will be when the axis of the roller 11 is directly below the axis of the eccentric. By selecting the proper eccentricity of the axis of the roller 11 in respect to that of the sleeve 14, the range of adjustment of the roller 11 may be made greater or lesser than in the specific construction illustrated.

In Fig. 1 there is shown rather diagrammatically, the gear train of a machine in which there are a plurality of operating pairs of rotary members for acting in succession on sheet material passing therebetween. In this case, power may be delivered to a gear 30 and transmitted therefrom to gears 20a, 20b, and 20c and these gears may mesh with the outer gear teeth 25 of annular idlers 21, and the inner teeth 26 of the idlers may mesh with the pinions 27 of the adjustable rollers. In Fig. 1, the three idlers are shown in different adjusted positions so that the space between the successive pairs of rotary members will be progressively less from the left to the right.

In the construction shown in Fig. 2, the idler has the internal teeth 26 and the external teeth 25 on the same part and directly opposite to each other. It will be obvious that in some constructions or for some purposes, either set of gear teeth may be axially offset in respect to the other, or they may be formed on separate parts secured together, or they may be of different relative diameters from those shown. In Fig. 5 I have illustrated a modified idler gear member 21a, in which the teeth 25a are of smaller pitch diameter than the teeth 26a, are axially offset, and are on a flange 21b bolted to the member 21a. The following claims are to be interpreted as including this form, as well as that shown in Fig. 2.

Having thus described my invention, what I claim as new and desire to secure by Leters Patent is:

1. A pair of rotary members, each having a gear, an eccentric bearing for supporting one of said members, whereby it may be rotated to move said member toward and from the other member, and an annular gear co-axial with said eccentric bearing, the gear of one of said members meshing with inwardly facing teeth on said annular gear, and the other of said members having a gear meshing with exterior teeth on said annular gear.

2. In combination, a pair of rotary members, each having a gear, an eccentric bearing for one of said members, and an annular gear eccentrically disposed in respect to the axis of said last mentioned member, and having internal teeth meshing with the gear of one of said members and exterior teeth meshing with the gear of the other member.

3. Driving means for a pair of juxtaposed parallel rollers, including a pair of gears, one on each roller, an annular idler gear having internal teeth meshing with one of said pair of gears, and external teeth meshing with the other of said pair of gears, and an annular sleeve encircling the axis of and supporting the roller having said last mentioned gear, said sleeve having an eccentrically disposed outer supporting surface whereby upon rotating said sleeve about the axis of said last mentioned roller the spacing between said rollers is varied.

4. In combination a frame member, a rotatable member supported by and journalled therein for rotation about a fixed axis, a second roller having an annular bearing member presenting a peripheral surface supported in said frame member, and eccentrically disposed in respect to the axis of said last mentioned roller, means for rotating said bearing member to vary the spacing between said rollers, and driving connections between said rollers including a pair of gears, one on each roller, and an idler gear coaxial with said annular bearing member, and having external teeth meshing with one of said pair of gears, and internal teeth meshing with the other of said pair of gears.

5. In combination a frame, a pair of parallel juxtaposed rotatable members, each having a bearing in said frame, one of said bearings having an eccentric peripheral surface supported in said frame, and an idler gear having external teeth meshing with one of said first mentioned gears, and internal teeth meshing with the other of said gears, said idler gear being coaxial with the peripheral surface of said bearing member.

6. In combination a frame member, a pair of parallel juxtaposed rotatable members projecting through said frame, a sleeve in said frame for supporting one of said members and having an eccentric peripheral supporting surface, gears on said members, and an idler gear coaxial with said eccentric surface, and having external teeth meshing with one of said first mentioned gears, and internal teeth meshing with the other of said gears.

7. Apparatus as defined in claim 6, in which said sleeve has a gear coaxial with said idler gear and a pinion meshing therewith for rotating said sleeve.

HERBERT C. BEHRENS.